June 17, 1958 D. H. ANDREWS 2,839,246
AUTOMATIC FIELD PLOTTER
Filed Sept. 20, 1955 2 Sheets-Sheet 1

INVENTOR
DAVID H. ANDREWS
BY George Sipkin
Lee J. Huntzberger
ATTORNEYS

June 17, 1958  D. H. ANDREWS  2,839,246
AUTOMATIC FIELD PLOTTER
Filed Sept. 20, 1955  2 Sheets-Sheet 2
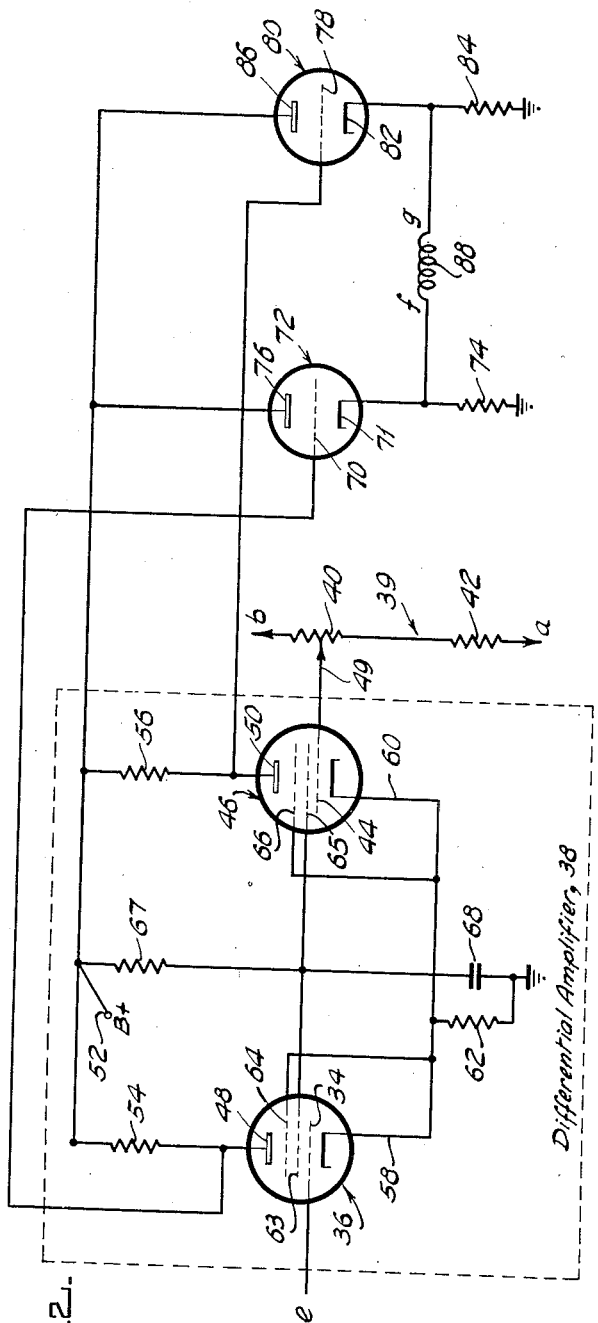
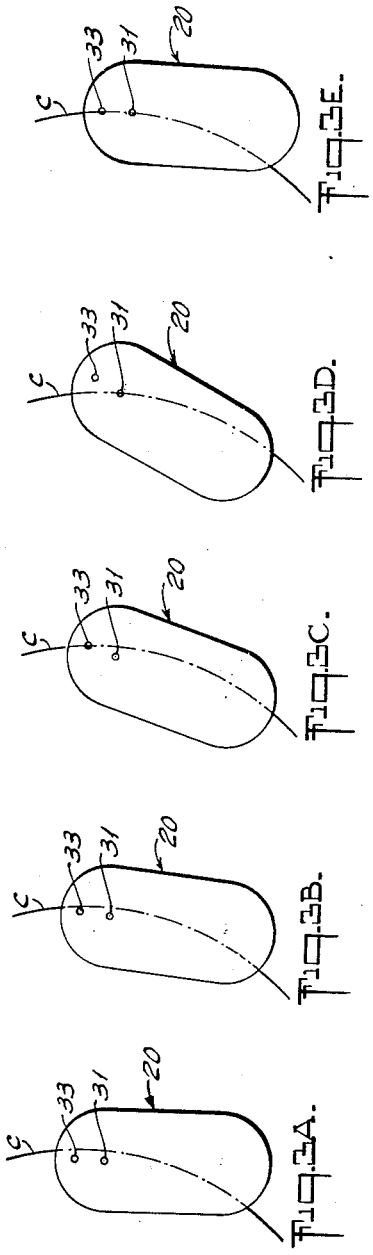
INVENTOR
DAVID H. ANDREWS
BY
ATTORNEYS

United States Patent Office 2,839,246
Patented June 17, 1958

2,839,246

AUTOMATIC FIELD PLOTTER

David H. Andrews, Glen Cove, N. Y.

Application September 20, 1955, Serial No. 535,540

8 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention is concerned with the analysis of systems which obey Laplace's and Poissons' equation and more particularly relates to an apparatus for automatically plotting electrostatic fields.

Analysis of electrostatic, magnetostatic and electric current fields such as are associated with charged, magnetized and conducting bodies have long been major problems in electrical theory and design. The basic concept of two dimensional stationary orthogonal fields as applied to electrical field problems can be equally applicable to problems in numerous other branches of physics and engineering. The mutual relationships of hydrodynamics, aerodynamics, gravitation and heat flow in basic field theory makes it possible to deduce analogies and translate solutions from one field to another, even though the problems may lie in different fields and appear unrelated. The connecting link between two dissimilar problems which have the same type of orthogonal field solution lies in the fact that each utilizes the same basic type of Poissons' and Laplace's equations in its solution.

A variety of experimental methods for obtaining field plots are known. One of the most used methods is in the utilization of an electrolytic tank or trough which contains a current conducting electrolyte and the size and shape of the trough are in conformity with the outline or boundaries of the device to be studied. Current is introduced into the electrolyte to suitably emerged electrodes and equipotential lines are traced with a detecting probe whose point is immersed in the solution. By means of a pantograph mechanism linked to the probe, a reproduction of the motion thereof is recorded on a paper chart.

The electrolytic trough method is basically effective and capable of giving satisfactory accuracy if suitable precautions are taken. However, it requires great care to produce such accurate results and considerable time is consumed in the production of a field plot. Among the many disadvantages are the requirement of an elaborate and laborious initial set of techniques, the involvement of a certain amount of shock hazard, polarization and phase shift difficulties, and the inherent problem of the use of a spillable electrolyte. Of course, there is also required a pantograph mechanism between the tracing probe and the recording stylus.

In an article by S. Helm and A. R. Hand in the September 1953 issue of "Industrial Laboratories" and entitled "Field plotting method uses models, analogy," there is disclosed a device which retains the basic advantages of the electrolytic trough method but at the same time eliminates the disadvantages encountered in the use of an electrolyte and a pantograph mechanism. The device embodies a thin dry sheet of electrical conducting paper of uniform resistance characteristics as the conducting layer in the place of the electrolytic solution. Currents are introduced as desired by attaching low resistance metallic electrodes to the surface. Boundary control conditions are established either by cutting out blank areas in the paper, or by applying resistance wire elements, or conducting areas of silver paint to the surface of the paper as the particular problem dictates. The device has the advantage of overcoming the need for the electrolytic trough to provide two dimensional replicas of the three dimensional elements of the system wherein the field is to be investigated. The electrodes on the uniform resistance paper are configured to be analogous to the longitudinal section of the electrodes or corresponding element in the actual device. The spacing relationship between electrodes is also analogous to the actual device. With this two dimensional analogy, problems in such diverse fields as fluid flow patterns, air flow patterns, electrostatic field patterns, magnetic flux distributions, etc. may be solved.

Although the device disclosed by Helm and Hand overcomes the problem of the use of the electrolytic trough with its accompanying disadvantages, it presents several disadvantages of its own. For example, there is still required the use of an operator to guide a stylus along the equipotential line in response to some null detecting or other suitable device in tracing the equipotential lines. If an attempt were made to automatize the tracing of these lines such as with a servo mechanism or other suitable device, it would be found that such a servo mechanism or other suitable device would tend to be rigid and have difficulty in traversing curved or sharply angular paths. To enable the traversing of an involved path, there would have to be utilized a complex servo device wherein resolvers and like mechanisms would be necessary.

It is, accordingly, the primary object of the present invention to provide an apparatus for automatically plotting fields, the solution of which is governed as an approximation by Laplace's or Poissons' equations.

It is a further object to provide an apparatus for automatically plotting electrostatic fields utilizing two dimensional analogous replicas of the electrodes of the actual device whose conditions is being determined.

In accordance with the present invention, there is provided an apparatus for automatically plotting the field of system which obeys Poissons' and Laplace's equations. It includes a sheet of electrically conductive paper which may have uniform resistance characteristics. Positioned upon the sheet are electrodes which are analogous two dimensional replicas of and in similar geometric relationship as the corresponding elements of the system being investigated. Means such as a battery for providing a potential gradient between the electrodes is connected therebetween. Two electrically conductive probes are provided which are adapted to sense potentials on the paper when in contact therewith, one of the probes also being adapted to write upon the paper. A member for mounting the probes in spaced relation is adapted to move along the sheet when actuated by a spring wound or electric motor. The member includes a pair of spaced substantially parallel wheels freely rotatable in vertical planes substantially parallel to an axis of the member and a third freely pivotable wheel for steering the member. A source of reference potential is provided such as a potentiometer or adjustable resistor connected in series arrangement with the battery. Coupled to the probes and to a point on the reference potential source and responsive to the potentials thereof is a circuit for providing a first output voltage which is a given proportion of the potential from the point on the reference potential source and for providing a second output voltage which is the sum of a first proportion of the potential sensed by one probe and a second proportion of the potential sensed by the second probe, the sum of the first and second proportions being equal to the given proportion. Means responsive to the magnitude and polarity of a voltage applied thereacross such as the movement of a D'Arsonval meter is provided for turning the steering wheel, the movement having applied thereto the first and second output voltages in series opposition and with a polarity to direct the member toward a point on the sheet having the reference potential.

Other objects and many of the attendant advantages of this invention will be readily appreciated as the same becomes better understood by reference to the following detailed description when considered in connection with the accompanying drawings wherein:

Fig. 2 is the circuit coupled to the arrangement depicted in Fig. 1 which is responsive to the intelligence obtained therefrom and which regulates the movement of the movable member; and Figs. 3a through 3e are illustrations explanatory of the operation of the invention.

Figure 1:
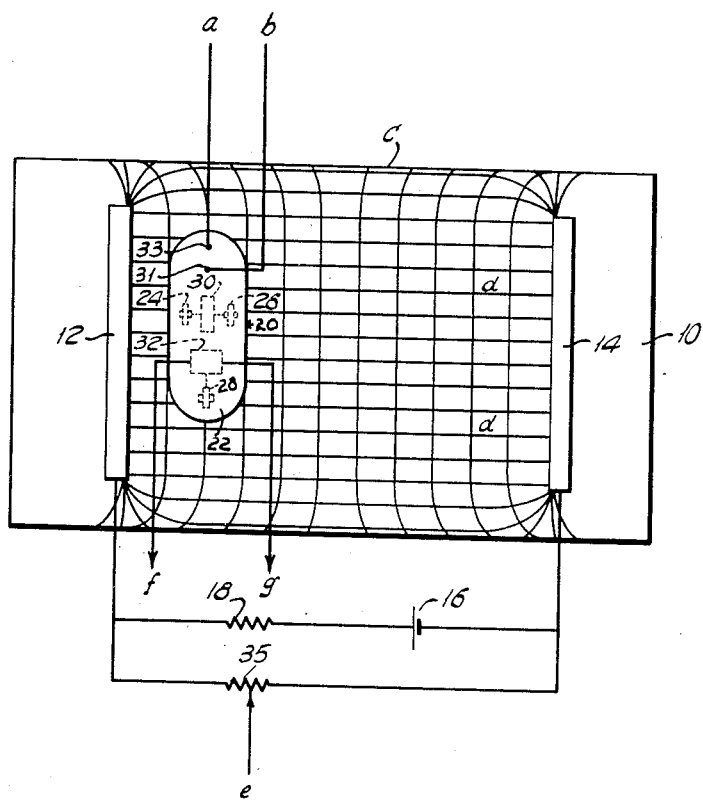
Fig. 1 is a schematic depiction of the electrical conductive sheet, electrodes thereon, and the movable member.

Referring now to Fig. 1, numeral 10 represents a thin sheet of paper of electrical conductivity having uniform resistance characteristics. Sheet 10 may consist of paper having a uniform coating of carbon or graphite and preferably should have a low resistance per unit area, say from about several hundred to a few thousand ohms. In addition to its low resistance, it should be possible to sense a voltage thereon with a light contact pressure. In situations where the elements of the system being investigated are axially symmetrical, the conductive coating on sheet 10 may be non-uniform such as a wedge-shaped layer to enable the determination of field patterns of analogous sections of such elements. Located on sheet 10 are electrodes 12 and 14 which may suitably consist of an air-drying silver paint. The paint may be the type normally used with brush or pen or that used with a silk screen and should have a resistance in the order of a few ohms when properly dried. Electrodes 12 and 14, when utilized in the present invention, are analogous two dimensional replicas of the corresponding elements of the system being investigated. In Fig. 1, they are shown as longitudinal sections of spaced parallel plates for simplicity of illustration, and it is to be understood that they will have the configurations respectively of longitudinal sections of the corresponding elements of the actual device. The dimensions and spacing arrangement of electrodes 12 and 14 are accordingly proportional to the dimensions and spacing arrangements of the corresponding elements. Connected between electrodes 12 and 14 is a source of direct current potential 16 such as a battery which provides a potential gradient therebetween. A current limiting resistor 18 may be provided in series with battery 14. Suitable contacts (not shown) to electrodes 12 and 14 may be made by various conventional methods such as weighted probes which permit the change of electrode patterns quite readily, Scotch tape to hold fine wires in contact with the electrodes or in the case of complicated electrode patterns, fine wires soldered directly to the silver paint by means of a pencil type soldering iron. Adapted to move on sheet 10 is a member 20 which includes a flat platform 22. The structures on the undersurface of platform 22 are shown in dotted outline. Platform 22 is mounted upon substantially parallel wheels 24 and 26 in spaced relation, wheels 24 and 26 being freely rotatable in vertical planes parallel to an axis of platform 22. As is shown in Fig. 1, member 20 may include a platform 22 which is of elliptical configuration, the planes of rotation wheels 24 and 26 being parallel to the long axis thereof. Member 20 includes a third wheel which is freely pivotable so that it is rotatable in any vertical plane and is utilized to steer member 20. To insure that wheel 28 is normally rotating in a plane parallel to the planes of rotation of wheels 24 and 26, it may be held by a conventional spring device (not shown) in such a position so that member 20 would be caused to move generally in a straight line unless otherwise directed. If, for convenience, it is considered that wheel 28 has mounted thereon the aft portion of the platform 22, two probes 31 and 33 which are electrically conductive and adapted to sense potentials on sheet 10 when in contact therewith may be considered to be mounted forward of wheels 24 and 26, in spaced relationship, and substantially aligned axially with the long axis of platform 22. One of probes such as probe 31 may also be adapted to write as it moves along sheet 10 and for this purpose the writing element may be a pen which writes with a suitable conductive ink such as a diluted silver paint. The rotation of wheels 24 and 26 may be suitably effected by a device 30 such as a spring wound clock motor or an electric motor. The degree of translational turning of wheel 28 from the plane parallel to the long axis of platform 22 is controlled by a device 32 such as the movement of a D'Arsonval meter, the operation thereof being explained in connection with Fig. 2. Connected across the series combination of battery 16 and resistor 18 is an adjustable resistor 35 such as a potentiometer which may be tapped at various points to give chosen voltages. The lead, designated as e, from the tapped point on resistor 35 is connected to the control grid 34 of one vacuum tube 36 of a differential amplifier 38 as shown in Fig. 2. Probe 33 is connected to end a of a series combination 39 of a potentiometer 40 and a resistor 42, probe 31 being connected to the other end b of combination 39. The potentiometer 40 and resistor 42 comprising combination 39 should preferably be of a relatively high magnitude to minimize any possible distortion of the field pattern on sheet 10. The potential at a point on potentiometer 40 is applied as the input to the control grid 44 of vacuum tube 46 through tap 49. Vacuum tubes 36 and 46 should at least have cathodes, anodes and control grids and preferably may be constant current amplifiers such as tetrodes or pentodes. They should both have the same quiescent currents and the plates 48 and 50 thereof should be connected to equal B+ potential sources 52 through resistors 54 and 56 having equal magnitudes. Cathodes 58 and 60 are connected to ground through a common resistor 62. Screen grids 63 and 65 are connected to B+ source 52 through a common resistor 67. Suppressor grids 64 and 66 are directly tied to their respective cathodes 58 and 60. Screen grids 65 and 67 are also connected to ground through a common capacitor 68. The output of the tube 36 is applied as the input to the grid of the tube 72, a cathode follower, the cathode 71 thereof being connected to ground through a resistor 74 and a plate 76 connected to B+ source 52. In the same manner, the output from tube 46 is applied as the input to the grid 78 of a tube 80 cathode follower, the cathode 82 thereof being connected to ground through cathode resistor 84 and the plate 86 thereof being connected to B+ source 52. Cathode follower tubes 72 and 80 also should be identical tubes having the same quiescent currents and cathode resistors 74 and 84 should be of equal magnitude. Connected between cathodes 71 and 82, there is schematically shown the coil 88 of the D'Arsonval movement 32 utilized to effect the pivoting of wheels 28.

Considering now the operation of the present invention, assuming it is desired that the equipotential line corresponding to a given voltage be traced on sheet 10, first a potential gradient between electrodes 12 and 14 is provided by battery 16. A voltage equal to the potential of the equipotential line desired to be traced is tapped from adjustable resistor 35 and connected to the input of tube 36. Probes 31 and 33 are connected to the opposite ends of the combination 39 of potentiometer 40 and resistor 42 substantially as heretofore described. Member 20 is placed upon the sheet in approximate location of the desired equipotential line and its movement is actuated by spring wound or electric motor 30 in a straight line across the sheet. If, at first, by chance the difference of potential between the potential sensed by probes 31 and 33 and the reference potential at 35 is zero, probes will be aligned on the desired equipotential line and the output from differential amplifier 38 will be zero. If, however, probe 31 senses a different potential than the reference potential from resistor 35, there will be an output from differential amplifier 38 and a consequent output from the cathode follower tubes 72 and 80 so that the current coursing through coil 88 will result in a turning of movement 32 and a consequent pivoting of wheel 28. The wheel will be turned in such a direction as to steer member 20 to the desired equipotential line until probe 31 makes contact therewith. It is to be understood that utilizing the principle of the present invention, device 32 which is proportionately responsive to the output of amplifier 38 may be a device of much greater mass and strength than a D'Arsonval meter movement and greater torque can be provided by amplifying the degree of movement such as with a servo follower. Assuming that probe 31 is positioned on sheet 10 so as to sense a different potential than the reference potential at resistor 35 and that probe 33 is at a different potential from probe 31, once probe 31 has found the equipotential line, the difference of potential existing between it and probe 33 cause a further movement of member 20 to cause probes 31 and 33 to be aligned on the chosen line and the member will thereafter move along such line. It is to be seen that with the arrangement 39 of potentiometer 40 and resistance 42, a much greater fraction of the potential sensed by probe 31 than that sensed by probe 33 is applied as the input to tube 46 since it is of primary importance that probe 31 first find the equipotential line and that the movement therebetwards be the determining factor in the direction of movement of member 20. Actually, with arrangement 39, the movement of member 20 is not separated into two distinct phases but consists of one smooth integrated movement which may be described as a vectorial addition of both movements. The ratio of the fractions of the potentials sensed by probes 31 and 33 applied as the input to tube 46 may be any desired amount depending upon the location of tap 49 on potentiometer 40.

Considering now Figs. 3a to 3e assuming it is desired that member 20 ride with probes 31 and 33 along potential line c. The structures on the undersurface of platform 22 have been omitted to permit greater clarity. As is shown, the probes are to the left of line c. Assume further that the potential between the probes 31 and 33 is zero and that both probes are at a potential positive with respect to the line. The output of differential amplifier 38 and consequent output of cathode follower tubes 72 and 80 will cause movement 32 to turn wheel 28 to the right, thus steering member 20 to the right as shown in Fig. 3b. In Fig. 3b, the device has turned to the right and the voltages on probes 31 and 33 have contradictory directional information. The potential sensed by probe 31 must be so amplified as to override in effect the potential developed between probes 31 and 33, thus the reason for the arrangement 39 of potentiometer 40 and resistance 42 to provide the greater amplification of the potential sensed by probe 31. Member 20 is accordingly further steered to the right until probe 31 locates on equipotential line c, as shown in Fig. 3d. It is now seen that if member 20 were to precede further to the right an unbalanced condition would be created so that the presence of the potential on probe 33 serves now to align both probes on equipotential line c and probes 31 and 33 will now move along this line. Effectively then, probe 33 serves the function of a directing probe. If probe 33 were not present, then there would be no mechanism for moving wheel 28 to cause member 20 to ride along the line once it had reached it. Now, assuming that equipotential line c is highly curved and winding, the curvature thereof would tend to cause the probe 33 to leave the line as member 20 is actuated in a straight course. Here again, the state of unbalance resulting between the probes due to such leaving would cause the member to follow the line due to the consequent voltage developed across movement 32. Thus, the magnitude of the potentials sensed by the probes and their relative polarities with respect to each other and the polarity of the potential at resistor 35 determine the direction and degree thereof provided by the D'Arsonval movement. Thus, it is to be seen that with the present invention, an equipotential line of twisting outline is readily traced without the need for complex servo-mechanisms having resolvers and like device built thereinto.

The lines c shown in Fig. 1 parallel to the faces of electrodes 12 and 14 are the equipotential lines and the lines d substantially perpendicular to lines c are field lines. Although the invention as described will draw the equipotential lines so that the field lines may have to be plotted, by arranging probles 31 and 33 in spaced relation in a line perpendicular to the long axis of platform 22, by eliminating the reference potential, and by applying the potential sensed by one probe as the input to one tube of the differential amplifier and by applying the potential sensed by the other probe as the input to the other tube of the differential amplifier, the field lines may be plotted directly. In this arrangement, the combination of the differential amplifier, cathode followers, and D'Arsonval movement will tend to keep the probes on the same equipotential line. For example, if member 20 were directed across the paper by the actuation of motor 30 in a direction perpendicular to the equipotential lines c, as the member would move from one equipotential line to the next, the probes would tend to follow a line perpendicular thereto as they would tend to simultaneously find the same equipotential line. The probes themselves could be the writing pens in this arrangement or a third probe may be provided therebetween and in line therewith to be utilized as the writing device.

Obviously many modifications and variations of the present invention are possible in the light of the above teachings. It is therefore to be understood that within the scope of the appended claims the invention may be practiced otherwise than as specifically described.

I claim:

1. An apparatus for automatically plotting the field of a system which obeys Poissons' and Laplace's equations comprising a sheet of electrically conductive paper; electrodes on said sheet which are analogous two dimensional replicas of and in similar geometric relationship as the corresponding elements of said system; means connected between said electrodes for providing a potential gradient therebetween; first and second conductive probes adapted to sense potentials on respective points on said paper when in contact therewith, one of said probes also being adapted to write upon said paper; a movable member upon which said probes are mounted in spaced relation, said member including a plurality of wheels freely rotatable only in planes substantially parallel to an axis of said member and a third freely pivotable wheel for steering said member; means for effecting movement of said member; a source of reference potential; a circuit coupled to the first and second probe and to a point on said reference potential source and responsive to the potentials thereof for providing a first output voltage which is a given proportion of the potential from said point and for providing a second output voltage which is the difference of a first proportion of the potential sensed by said first probe and a second proportion of the potential sensed by the second probe, one of said first and second proportions being much larger than the other of said first and second proportions, means responsive to the magnitude and polarity of a voltage applied thereacross for turning said steering wheel; means for applying said first and second output voltages across said wheel turning means in series opposition and with a polarity to direct said member toward a portion on said sheet where said second output voltage equals said first output voltage.

2. An apparatus as defined in claim 1 wherein said circuit includes first and second amplifier means, means for applying said potential at said point as an input to said first amplifier means; resistance means, the opposite ends of which are connected to said first and second probes respectively; and an adjustable tap on said resistance means and connected to the input of said second amplifier means; whereby the output voltage of the first amplifier means is said first output voltage and the output voltage of said second amplifier means is said second output voltage.

3. An apparatus as defined in claim 2 wherein the cathode currents of said first and second amplifier means are fed through a common unbypassed cathode resistance.

4. An apparatus as defined in claim 2 wherein said means for applying said first and second output voltages across said wheel turning means include first and second cathode followers; means for applying said first output voltage as an input to said first cathode follower; means for applying said second output voltage as an input to said second cathode follower; and means for connecting said wheel turning means between the respective cathodes of said cathode followers.

5. An apparatus as defined in claim 2 wherein said wheel turning means is a D'Arsonval movement.

6. An apparatus as defined in claim 2 wherein said means for effecting movement of said movable member is a spring wound clock motor.

7. An apparatus as defined in claim 2 wherein said means for effecting movement of said movable member in an electric motor.

8. An apparatus as defined in claim 2 wherein said electrically conductive sheet is of uniform resistivity.

References Cited in the file of this patent

UNITED STATES PATENTS 2,751,273    Rankin _____ June 19, 1956

OTHER REFERENCES

Industrial Laboratories (Helm et al.), September 1953, pages 122 to 124.